United States Patent [19]
Hearsey

[11] 3,873,553
[45] Mar. 25, 1975

[54] PROCESS FOR PREPARING N-MONOSUBSTITUTED CARBAMATES

[75] Inventor: Colin John Hearsey, Surbiton, England

[73] Assignee: Quimco GmbH, Zurich, Switzerland

[22] Filed: Dec. 6, 1972

[21] Appl. No.: 312,752

[30] Foreign Application Priority Data
Dec. 6, 1971 United Kingdom........... 56581/71

[52] U.S. Cl... 260/295 CA, 260/77.5 B, 260/468 E, 260/471 C, 260/479 C, 260/482 B, 260/482 C
[51] Int. Cl..................... C07c 125/06, C07d 31/34
[58] Field of Search ........ 260/471 C, 468 E, 479 C, 260/482 C, 295 CA

[56] References Cited
OTHER PUBLICATIONS
Adams et al., "Chem, Rev.," 65, (1965), pp. 573.
Lee et al., "J. Ass. Offic. Anal. Chem.," Vol. 54, (1971), pp. 1361-1365.

*Primary Examiner*—Lorraine A. Weinberger
*Assistant Examiner*—Michael Shippen
*Attorney, Agent, or Firm*—Clelle W. Upchurch

[57] ABSTRACT

The present invention provides a process for preparing N-monosubstituted carbamates of the general formula:

$$R(NHCOOR''')_n$$

in which R is a substituted or unsubstituted aliphatic, cycloaliphatic, aromatic or heterocyclic radical, R''' is a substituted or unsubstituted aliphatic, cycloaliphatic, aromatic or heterocyclic radical and $n$ is an integer, wherein a trisubstituted urea of the general formula:

$$R(NHCONR'R'')_n$$

in which R has the same meaning as above, R' is a substituted or unsubstituted monovalent aliphatic or aromatic radical and R'' is a substituted or unsubstituted monovalent aliphatic radical or R' and R'' together represent a substituted or unsubstituted divalent radical in which at least one of the two carbon atoms adjoining the nitrogen atom of the urea group is aliphatic, is reacted at an elevated temperature with a hydroxy compound of the general formula:

$$R'''(OH)_m$$

in which R''' has the same meaning as above and $m$ is an integer, and with gaseous hydrogen chloride.

11 Claims, No Drawings

PROCESS FOR PREPARING N-MONOSUBSTITUTED CARBAMATES

The present invention is concerned with a process for the preparation of N-mono-substituted carbamates from trisubstituted ureas.

N-Monosubstituted carbamates are usually prepared by the reaction of an isocyanate with an alcohol or a phenol or by the reaction of a primary amine with a chloroformic acid ester; these methods normally, although not essentially, involve the use of phosgene to prepare the isocyanate or the chlorformic acid ester.

It is also known that N-monosubstituted carbamates may be prepared by the reaction of an alcohol with certain types of substituted urea, in particular N-arylureas, N,N'-diarylureas, trialkylureas and N-aryl-N',N'-dialkylureas. Each of these types of substituted urea may be readily prepared from aryl and/or alkyl amines without the use of phosgene and it follows that an important advantage of the "alcoholysis" method over the other methods mentioned above is that it does not require the use of phosgene at any stage during the preparation of the reactants. However, satisfactorily high conversions in the majority of these alcoholyses of substituted ureas are only achieved after long reaction times, for example, 4 hours for an 80 percent conversion at 160°C. of 1,1-dimethyl-3-phenylurea to cyclohexyl N-phenylcarbamate.

It is an object of the present invention to provide a substantially improved process for preparing N-monosubstituted carbamates from trisubstituted ureas.

Thus, according to the present invention, there is provided a process for preparing N-monosubstituted carbamates of the general formula:

in which R is a substituted or unsubstituted aliphatic, cycloaliphatic, aromatic or heterocyclic radical, R''' is a substituted or unsubstituted aliphatic, cycloaliphatic, aromatic or heterocyclic radical and $n$ is an integer, wherein a trisubstituted urea of the general formula:

in which R has the same meaning as above,

R' is a substituted or unsubstituted monovalent aliphatic or aromatic radical and R'' is a substituted or unsubstituted monovalent aliphatic radical or R' and R'' together represent a substituted or unsubstituted divalent radical in which at least one of the two carbon atoms adjoining the nitrogen atom or the urea group is aliphatic, is reacted at an elevated temperature with a hydroxy compound of the general formula:

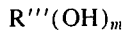

in which R''' has the same meaning as above and $m$ is an integer, and with gaseous hydrogen chloride.

In the above-given general formulae, $n$ and $m$, which may be the same or different, are preferably 1 or 2.

When the value of the integer $m$ is greater than 1, a variety of products may be formed. For example, if the hydroxy compound, $R'''(OH)_m$, is present in large stoichiometric excess, then the major produce obtained has the general formula, $R[NHCOOR'''(OH)_{m-1}]_n$. Alternatively, if the hydroxy compound is present in a very small stoichiometric excess and $m$ and $n$ are both 2, then the major product is a polyurethane of the general formula $HO[R'''OCONHRNHCOO]_xR'''OH$, wherein $x$ is an integer. Other examples will be apparent to those skilled in the art.

According to a modification of the process of the present invention, a trisubstituted urea of the general formula, $(HO)_mR(NHCONRO'R'')_n$, is reacted with gaseous hydrogen chloride at an elevated temperature. In this case, each hydroxyl group is attached to the same molecule as one or more urea groups and this polyfunctionality leads to the formation of a polyurethane, with the proviso that when the hydroxyl group is separated from the urea group by two, three, four or five carbons, cyclisation may also occur and may even predominate. When $m$ and $n$ are both 1, the polyurethane product has a linear structure but in all other cases the polyurethane is either branched or crosslinked, the degrees of which depend upon the individual values of $m$ and $n$.

Typical but not limiting substituents in R and R''' include nitro, alkyl, alkoxy, halogen, aryl and heterocyclic; typical but not limiting substituents in R' are nitro, alkyl and aryl; and typical but not limiting substituents in R'' are nitro and aryl.

When $m$ is 1, the reaction of the process of the present invention may be represented by the following equation:

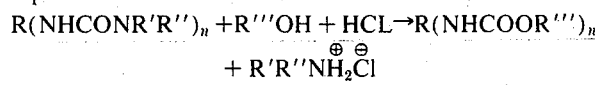

The reaction can be carried out in an inert solvent, a wide range of which can be used.

The preferred temperature at which the reaction is carried out depends, to some extent, upon the nature of the trisubstituted urea used. In general, a higher reaction temperature is required when R is aliphatic than when R is aromatic but the preferred temperature for either class is normally within the range 100°–200°C.

Except in certain special cases, it is preferred to use the hydroxy compound in excess. However, too great an excess of a volatile alcohol may reduce the reaction temperature, thereby causing the reaction to slow down or even to cease.

The reaction may be carried out either at atmospheric or at superatmospheric pressure.

An excess of hydrogen chloride is preferably used to ensure complete reaction and an inert gas, such as nitrogen or carbon dioxide, can be passed through the reaction mixture, after completion of the reaction, in order to flush out residual hydrogen chloride.

The time required for completion of the reaction depends upon several factors but, apart from a few exceptions, it is normally within the range of 3 minutes to 1 hour.

The yield of carbamate obtained by the process of the present invention varies according to the nature of R but is most usually within the range of 80–90 percent.

Examples of carbamates which may be prepared by the process of the present invention include isopropyl N-phenyl carbamate, sec-butyl-N-phenyl carbamate, n-butyl N-phenyl carbamate, phenyl N-phenyl carbamate, isopropyl N-3-chlorophenyl carbamate, isopropyl N-3,4-dichlorophenyl carbamate, isopropyl N-5-chloro-2-methoxyphenyl carbamate, isopropyl N-3-methylphenyl carbamate, 4-chlorobut-2-ynyl N-m-chlorophenyl carbamate, cyclohexyl N-4-nitrophenyl carbamate, cyclohexyl N-cyclohexyl carbamate, phenyl N-hexyl carbamate, 1-naphthyl N-methyl carbamate, ethyl N-benzyl carbamate, 1,4-butylene-bis-(N- phenyl carbamate), cyclohexyl N-2-pyridyl carbamate, N,N'-methylene-di-p-phenylene-bis-(isopropyl carbamate), N,N'-(2,4-tolylene)-bis-(n-butyl carbamate) and N,N'-p-phenylene-bis-(4-hydroxybutyl carbamate).

A secondary amine hydrochloride is formed as a by-product of the reaction. By ensuring its insolubility in the selected solvent, it may be removed, for example, by centrifuging or filtering. Alternatively, the solvent and/or excess hydroxy compound may be removed by distillation or by filtration if both the amine hydrochloride and the carbamate are insoluble and the amine hydrochloride and carbamate are separated subsequently by solvent extraction. The free amine may be recovered quantitatively by reaction of the hydrochloride with an alkali.

The carbamate obtained is normally isolated from the amine hydrochloride and solvent as described above. In some cases, however, such techniques do not adequately isolate the product from the excess hydroxy compound. This is particularly the case when the hydroxy compound is a phenol, in which case excess phenol may be extracted from the reaction product by washing with aqueous alkali.

The carbamates obtained by the process according to the present invention have a number of important uses, especially as agricultural chemicals, in medicine and in polymer chemistry.

The following Examples are given for the purpose of illustrating the present invention:

EXAMPLE 1

Dry hydrogen chloride gas was passed through a solution of 6.0 g. 1,1-diethyl-3-phenylurea and 12 g. n-butanol in 60 g. dichlorobenzene at 125°C. Infra-red analysis was used to monitor the progress of the reaction. The reaction was complete after 10 minutes and the reaction mixture was then cooled and filtered to remove diethylamine hydrochloride (3.5 g.) in 100 percent yield. The volatiles were distilled from the filtrate under reduced pressure and the residue was recrystallised from petroleum ether (b.p. 60°–80°C.) to give 5.4 g. (90 percent of theory) n-butyl N-phenyl carbamate; melting point 59°–61°C.

EXAMPLE 2

6.0 g. 1,1-Diethyl-3-phenylurea were treated with dry hydrogen chloride gas and 4.0 g. isopropanol in 60 g. o-dichlorobenzene in the manner described in Example 1 to give diethylamine hydrochloride (3.5 g.) in 100 percent yield and 4.8 g. (86 percent of theory) isopropyl N-phenyl carbamate; melting point 84°–85°C.

EXAMPLE 3

3.0 g. Trimethylurea were treated with dry hydrogen chloride gas and 6.0 g. 1-naphthol in 90 g. o-dichlorobenzene for 45 minutes at 160°C. The solvent was then distilled from the reaction mixture under reduced pressure and the resiude was washed first with water to remove dimethylamine hydrochloride and then with dilute aqueous potassium hydroxide to remove excess 1-naphthol. The remainder of the residue was recrystallised from benzene/petroleum ether to give 2.8 g. (47 percent of theory) 1-naphthyl N-methyl carbamate; melting point 139°–141°C.

EXAMPLE 4

Dry hydrogen chloride gas was passed through a solution of 6.0 g. 1-m-chlorophenyl-3,3-dimethylurea and 4.0 g. isopropanol in 50 g. o-dichlorobenzene at 150°C. The reaction was shown, by infra-red analysis, to be complete after 15 minutes, at which stage the volatiles were distilled off under reduced pressure from the reaction mixture. The residue was extracted with boiling petroleum ether (b.p. 40°–60°C.) and filtered while hot. The filtrate was cooled to give a precipitate of 5.7 g. (88 percent of theory) isopropyl N-3-chlorophenyl carbamate; melting point 36°–37°C.

EXAMPLE 5

Dry hydrogen chloride gas was passed through a solution of 5.0 g. 1-cyclohexyl-3,3-dimethylurea and 4.0 g. cyclohexanol in o-dichlorobenzene at 170°C. After 25 minutes, the reaction was shown, by infra-red analysis, to be complete and the volatiles were distilled off from the reaction mixture under reduced pressure. The residue was extracted with boiling petroleum ether (b.p. 60°–80°C.) and filtered while hot. The filtrate was cooled to give a precipitate of 6.0 g. (91 percent of theory) cyclohexyl N-cyclohexyl carbamate; melting point 76°–78°C.

What we claim is:

1. A process for making an N-monosubstituted carbamate which comprises introducing gaseous hydrogen chloride into a substantially anhydrous mixture at about 100° to 200°C. containing a trisubstituted urea having the formula $$R(NHCONR'R'')_N$$

and an alcohol, phenol or naphthol having the formula $$R'''OH$$

wherein R is alkyl having up to six carbon atoms, cyclohexyl, pyridyl, unsubstituted phenyl, 1,4 butylene, phenylene, methylene diphenylene or halogen, alkoxy, alkylalkyl or nitrosubstituted phenyl, phenylene or methylene diphenylene, R' and R'' are lower alkyl and R''' is lower alkyl, 4-chlorobut-2-ynyl, phenyl, cyclohexyl or naphthyl and N is 1 or 2.

2. A process according to claim 1 wherein the hydrogen chloride is used in excess.

3. A process according to claim 1 wherein the hydroxy compound is used in excess.

4. A process according to claim 1 wherein the reaction is carried out in an inert solvent.

5. A process according to claim 1 wherein, after completion of the reaction, the reaction mixture is flushed with an inert gas to remove residual hydrogen chloride.

6. The process of claim 1 wherein the N-monosubstituted carbamate is isopropyl N-phenyl carbamate, sec-butyl-N-phenyl carbamate, n-butyl N-phenyl carbamate, phenyl N-phenyl carbamate, isopropyl N-3-chlorophenyl carbamate, isopropyl N-3-chlorophenyl carbamate, isopropyl N-3,4-dichlorophenyl carbamate, isopropyl N-5-chloro-2-methoxyphenyl carbamate, isopropyl N-3-methylphenyl carbamate, 4-chlorobut-2-ynyl N-m-chlorophenyl carbamate, cyclohexyl N-4-nitrophenyl carbamate, cyclohexyl N-cyclohexyl carbamate, phenyl N-hexyl carbamate, 1-naphthyl N-methyl carbamate, ethyl N-benzyl carbamate, 1,4-butylene-bis-(N-phenyl carbamate), cyclohexyl N-2-pyridyl carbamate, N,N'-methylene-di-p-phenylene-bis-(isopropyl carbamate), N,N'-(2,4-tolylene)-bis-(n-butyl carbamate) or N,N'-p-phenylene-bis-(4-hydroxybutyl carbamate).

7. The process of claim 1 wherein the trisubstituted urea has the formula

and the alcohol, phenol or naphthol has the formula

wherein R is unsubstituted phenyl, phenylene or methylene-diphenylene or halogen, alkoxy, alkyl or nitro-substituted phenyl, phenylene or methylenediphenylene, R' and R'' are lower alkyl and R''' is 4-chlorobut-2-ynyl, lower alkyl or cyclohexyl and $n$ is 1 or 2.

8. The process of claim 1 wherein the trisubstituted urea has the formula

and R''' in the compound having the formula

is lower alkyl or cyclohexyl.

9. The process of claim 7 wherein R''' is isopropyl, butyl, 4-chlorobut-2-ynyl, cyclohexyl or ethyl.

10. The process of claim 7 wherein R''' is a linear or branched alkyl group having up to four carbon atoms.

11. The process of claim 1 wherein the pressure is atmospheric or above atmospheric.

* * * * *

UNITED STATES PATENT OFFICE
CERTIFICATE OF CORRECTION

PATENT NO. : 3,873,553
DATED : March 25, 1975
INVENTOR(S) : COLIN JOHN HEARSEY

It is certified that error appears in the above—identified patent and that said Letters Patent are hereby corrected as shown below:

Column 2, line 5, the formula should read as follows:

$$(HO)_m R(NHCONR'R'')_n$$

Signed and Sealed this twenty-second Day of July 1975

[SEAL]

Attest:

RUTH C. MASON
Attesting Officer

C. MARSHALL DANN
Commissioner of Patents and Trademarks